United States Patent [19]

Schumacher

[11] Patent Number: 5,091,001
[45] Date of Patent: Feb. 25, 1992

[54] DISPOSAL OF SPENT VANADIUM PENTOXIDE CATALYST BY VITRIFICATION

[76] Inventor: Pierre L. J. Schumacher, Route De Gembloux 224, 5053, Aische En Refail, Fed. Rep. of Germany

[21] Appl. No.: 580,774

[22] Filed: Sep. 11, 1990

[30] Foreign Application Priority Data

Sep. 12, 1989 [GB] United Kingdom ................. 8920636

[51] Int. Cl.⁵ ........................ C22B 13/00; C22B 19/00
[52] U.S. Cl. ....................... 75/586; 405/129; 423/DIG.12; 75/640; 75/655; 75/693; 75/751
[58] Field of Search ................. 75/586, 751, 655, 640, 75/693; 405/129; 423/DIG. 12

[56] References Cited

U.S. PATENT DOCUMENTS

| | | | |
|---|---|---|---|
| 4,017,308 | 4/1977 | Peterson et al. | 75/695 |
| 4,272,293 | 6/1981 | Hooykaas | 405/129 |
| 4,356,030 | 10/1982 | Halpin et al. | 75/586 |
| 4,532,113 | 7/1985 | Chao et al. | 423/DIG. 12 |
| 4,668,124 | 5/1987 | Pitts et al. | 405/129 |

*Primary Examiner*—Melvyn J. Andrews
*Attorney, Agent, or Firm*—Krass & Young

[57] ABSTRACT

Spent oxidic catalyst, such as vanadium pentoxide from a sulphuric acid manfacturing process, is rendered into an environmentally acceptable non-leachable form suitable for disposable by incorporation into a vitrified amorphous slag formed of oxidic slag forming agents such as CaO, SiO₂, FeO and Al₂O₃. The vitrified slag may be formed as part of a conventional ferrous or non-ferrous smelting process, or may employ a pre-existing slag from such a process.

19 Claims, No Drawings

DISPOSAL OF SPENT VANADIUM PENTOXIDE CATALYST BY VITRIFICATION

The present invention relates to a method of processing spent metal oxide based catalyst, particularly vanadium pentoxide catalysts used in the production of sulphuric acid, into a vitrified form which is environmentally suitable for disposal.

The vitrified catalyst is amorphous and is not leached out by water under normal environmental conditions of temperature, acidity, alkalinity etc.

Regulatory authorities worldwide continue to require the safe disposal of spent chemicals from industrial processes, including catalysts. It is therefore a continuing requirement to improve the disposal of such chemicals.

In the manufacture of sulphuric acid, sulphur dioxide reacts with oxygen over a vanadium pentoxide catalyst to produce sulphur trioxide. The catalyst is usually contained in a four-stage converter. The first stage catalyst is usually replaced every time the plant is shut down for maintenance. Typically, fresh catalyst has a composition on a percent weight/weight basis as follows:

| | | |
|---|---|---|
| $V_2O_5$ catalyst | 7.5 to 8.5% | (4.78) |
| $K_2O$ active salt | 10 to 12% | (6.44) |
| $SiO_2$ support | 65 to 70% | (50) |
| $SO_2/SO_3$ volatiles | 10 to 12% | (—) |
| Sulphates | 5 to 6% | (25.92) |
| $Na_2O$, $Fe_2O_3$, CaO | less than 3% | (0.55 as $Na_2O$) |

Typical figures for the spent catalyst composition are given in brackets. The vanadium pentoxide content of the spent catalyst is usually reduced somewhat, whilst the sulphates content is higher than for the fresh composition.

At present, the spent catalyst is difficult to dispose of safely. Vanadium metal is poisonous. Generally, the spent catalyst is sealed in steel or plastic drums and stocked in old mines, or encased in concrete and dumped at sea. There have been attempts to recover and recycle the vanadic liquor but this has resulted in catalyst whose quality varies between batches.

It is an object of the present invention to mitigate these problems and to allow for the successful processing of spent metal oxide based catalysts into a form which may be safely disposed of under normal environmental conditions e.g. as landfill.

Generally stated, the invention involves the vitrification of the spent catalyst as part of the composition of a vitrified metallurgical slag such that the catalyst is in amorphous form and thus particularly insoluble in rainwater and around water.

A first aspect of the present invention provides a method of processing spent metal oxide based catalyst into a vitrified form which is environmentally suitable for disposal; which comprises introducing the spent catalyst metal oxide into a furnace together with oxidic slag-forming materials, melting together the spent catalyst metal oxide and the slag-forming materials to form a slag;

removing the slag and solidifying it into a vitreous mass;

the spent catalyst metal oxide and the slag-forming materials being used in amounts such as to result in a solid amorphous vitrified disposable slag.

A second aspect of the invention relates to the solid amorphous vitrified disposable slag incorporating the metal oxide based catalyst.

Thus, the present invention is based on the unexpected discovery that the metal oxide based catalyst can be successfully incorporated into a solid amorphous vitrified slag oxide matrix, from which the metal does not become leached by water under normal environmental conditions.

The invention is particularly applicable where the spent catalyst includes a substantial proportion of an oxide, such as silica, which is itself a slag-forming material.

The vitrified slag may be formed in a dedicated process using fresh slag-forming materials. However, it is preferred to use pre-existing slags from a smelting process, if possible prior to cooling. Alternatively, it is possible to include the metal oxide based catalyst in the slag forming materials introduced into a conventional smelting process, though this may result in slight increases in requirements for fuel and slag-forming materials and some loss in smelted metal production.

The slags from the principal metal oxide reduction process include ore gangues and added slag-forming materials and generally comprise the following principle components:

Iron Industry—calcium oxide, silica and aluminium oxides

Zinc & Lead Industry—calcium oxide, silica and iron oxide

In reality the slags also contain minor amounts of other oxides such as (in the case of zinc and lead smelting operations) aluminium oxide, magnesium oxide, barium oxide, lead oxide, zinc oxide, manganese dioxide and nickel oxides. The use of slags from conventional smelting processes (which are otherwise practically worthless) allows spent catalyst to be made into a vitrified disposable form in a particularly economical manner.

It may also be possible to introduce the metal oxide based catalyst into slags derived from smelting operations for the recovery of copper, nickel, cobalt and silver.

The slag formed is a liquid at process temperatures whose composition can be represented on a ternary diagram (e.g. for $CaO-SiO_2-FeO$) or quaternary diagram (e.g. for $CaO-SiO_2-FeO-Al_2O_3$). The liquid configuration is amorphous, and is in fact a glass. The amount of spent catalyst which may be incorporated into the slag forming materials is such as to maintain this glassy state, the catalytic metal oxide becoming trapped in the glassy matrix. The catalytic metal oxide content is usually less than 5 wt %, preferably less than 2 wt %.

In the case of spent catalyst which is silica-based, the amount of spent catalyst which may be incorporated into the vitrified disposable slag is usually determined by the silica content. Thus, the amount of spent catalyst is chosen such as to provide a glassy slag forming amount of silica in the final disposable slag, and the ratio of spent catalyst to slag-forming material/pre-existing slag is usually in the region 1:2 to 1:4 (preferably 1:2.5 to 1:3.5).

For reasons of economy, it is preferred to use pre existing slag from a smelting operation such as from zinc smelting (typical content 27% $SiO_2$, 19% CaO and 54% FeO by weight) or from lead smelting (typical content 31% $SiO_2$, 29% CaO and 40% Fe by weight).

Generally, the slag and incorporated catalytic metal oxide should have a maximum melting point of 1200° C. to allow for complete melting under economically viable conditions. It is important to obtain a liquid slag which has the correct viscosity and which flows. Generally speaking, $Al_2O_3$—CaO—$SiO_2$ slags having melting points which are too high for use in the present invention. The liquid slag leaving the furnace is cooled, usually by quenching with water. However, slow cooling may also yield a vitrified slag.

In one embodiment of the invention the metal oxide based catalyst is introduced into the smelter together with the other slag forming materials. However, where a preliminary roasting step is carried out it is preferred to introduce the spent catalyst into the roaster. The metal oxide of the spent catalyst then forms part of the calcine (e.g. lead oxide or zinc oxide) which is in turn fed to the smelter. Roasting involves the conversion of metal sulphide ores to the corresponding oxides by the use of oxygen enriched air.

In another embodiment, the spent catalyst is melted in a furnace with the slag forming materials in a dedicated process. The slag forming materials may be fresh, but it is more economical to use pre-existing slag.

The furnace is preferably a rotary furnace (e.g. a horizontal axis furnace or a pivotable furnace such as a Kalko furnace) and the spent catalyst and slag-forming materials are preferably charged separately. In one alternative, solid catalyst is introduced into the furnace and melted, prior to introduction of molten slag, followed by mixing. In another alternative, the spent catalyst is injected into the molten slag by means of a lance.

A further option is the use of a Kalko furnace; where molten slag is introduced with the furnace vertical and catalyst injected into the slag whilst heating to keep the temperature constant. The bath is then further heated using a submerged lance burning gas and air (optionally oxygen enriched). This gives good mixing or provides an improved heat balance.

The spent metal oxide catalyst may be used as such. Alternatively, the metal oxide content may be removed from the catalyst residue (e.g. as a liquor) before being mixed with the slag-forming materials.

Embodiments of the present invention will now be described by way of example only.

EXAMPLE 1

(Zinc Smelting)

In a zinc smelting operation, 20 tonnes of spent vanadium pentoxide catalyst were introduced over a 24 hour period into the smelter, together with recycled slag from the smelter and from an electrolytic refining process. The slag was tapped from the smelter and allowed to solidify into a vitreous mass. Over a number of samples tested, the maximum vanadium pentoxide content was 0.32% by weight (corresponding to approximately 5% of spent catalyst with respect to the total slag-forming ingredients).

Tests were carried out (Institut De Recherches Hydrologiques) to determine whether vanadium leached from the vitreous slag under typical environmental conditions. Granules of the slag were agitated with water at pH6 to 6.5 (corresponding to rainwater containing dissolved carbon dioxide and sulphur dioxide). Three successive samples were taken and the solution recovered from the lixiviation test was analysed for vanadium. In all three cases the vanadium content was less than 0.05mg/l i.e. below the limits of detection of the apparatus. This demonstrates that the vanadium was locked into the vitreous oxide matrix of the slag.

EXAMPLE 2

(Lead Smelting)

In the smelting of lead in a water jacketed lead blast furnace, six tonnes of spent catalyst were added at the rate of 250 kg/h. The liquid slag was recovered and quenched and found to contain a maximum of 0.14% vanadium pentoxide by weight (corresponding to about 2-3% of spent catalyst in the slag).

Three successive leaching tests with water at pH 6-6.5 were carried out as in Example 1. Once again, the leached vanadium content at each stage was less than 0.05 mg/l i.e. below the limits of detection.

EXAMPLE 3

(General Non-Ferrous Smelting)

Non-ferrous smelting generally involves the following stages. The present invention can be carried out by introducing the spent catalyst either into the roaster or into the smelting furnace.

(i) Proportioning bin, where the sulphidic ores and melting agents are introduced in the correct amounts, (ii) Mixer, where mixing occurs with the addition of water, (iii) Roaster, where the solid sulphidic ores are roasted in air yielding the non-ferrous metal oxide and releasing $So_2$ (iv) Crusher, where the roasted ore is crushed (v) Hopper, where the crushed ore is collected (vi) Furnace, where the roasted ore is smelted together with slag-forming materials. The slag is tapped off and quenched with water.

In the first alternative, spent vanadium pentoxide catalyst is introduced into the proportioning bin prior to the roasting stage. This way is preferred since the silica content of the spent catalyst replaces some of the silica added to the charge so that the slag volume at the end of the process remains constant and there are no additional costs.

In the second alternative, the spent catalyst is introduced into the hopper prior to the smelting furnace. The spent catalyst may be added to the roasted or sintered ore, to the coke or to other products in the feed system. The spent catalyst may be surplus to other additives or may replace silica if silica is to be charged. The spent catalyst is introduced progressively with time.

If the ore is acid, it may be necessary to add calcium oxide to compensate for the additional silica introduced in the spent catalyst, e.g. about equal weights of CaO and spent catalyst.

In the case of zinc smelting, the losses associated with introduction of the spent catalyst include the following. Some additional zinc is lost in the slag, estimated at about 140 kg per tonne of catalyst. There is an additional coke consumption of about 120 kg. per tonne of catalyst. Also about one additional tonne of CaO is required per tonne of spent catalyst.

EXAMPLE 4

(Use of Pre-existing Non-ferrous Slag)

There are two problems to solve; firstly to obtain a slag (including the spent catalyst) which melts to give the correct viscosity, and flows. Secondly, the final slag must be amorphous and vitreous.

Typically spent vanadium pentoxide catalyst from sulphuric acid manufacture includes 4.78% $V_2O_5$, 6.44% $K_2O$, 0.55% $Na_2O$, 50% $SiO_2$ and 25.92% sulphate and has an initial softening temperature of 910° C., and initial and final melting temperatures of 1040° C. and 1170° C. respectively. However, the melted product is not amorphous and does not vitrify on cooling.

Slags from zinc refining have a typical weight composition 27% $SiO_2$, 19% CaO and 54% FeO. Slag from lead refining contains typically 31% $SiO_2$, 29% CaO and 40% FeO.

In order to provide a final slag of melting point less than 1200° C. it is necessary to control the amount of silica added in the form of spent catalyst. In practice the following ratios are predicted from the $CaO-FeO-SiO_2$ phase diagram:

1 kg spent catalyst per 2.8 kg zinc slag
1 kg spent catalyst per 2.4 kg lead slag In general about 2.5–3 tonnes of slag are required per tonne of catalyst, and a typical final slag composition is:

| | |
|---|---|
| $SiO_2$ | 45–50 wt % |
| CaO | 15–20 wt % |
| FeO | 30–50 wt % | the balance being the residue of the spent catalyst and incidental impurities.

It is found that low ratios e.g. 1:1 give slags which are too viscous.

EXAMPLE 5

(Use of Zinc Slag)

Zinc slag was used in the ratio 6 tonnes of slag for 1.65 tonnes of spent vanadium pentoxide catalyst of the same composition as Example 4. The initial composition of the slag and of the final vitrified slag was;

| | (Initial wt %) | (Vitrified slag wt %) |
|---|---|---|
| Pb | 0.79 | (0.62) |
| Zn | 5.38 | (4.22) |
| FeO | 51.3 | 38.4 |
| CaO | 10.77 | 9.2 |
| $SiO_2$ | 18.5 | 33.3 |
| $Al_2O_3$ | 7.9 | (6.20) |
| $V_2O_5$ | — | 1.28 |
| Impurities | Balance | Balance |

(The figures in brackets are calculated values).

(The figures in brackets are calculated values).

The spent catalyst and slag is introduced into a mixing drum before passing to the furnace for smelting. The molten slag is rapidly quenched in water to form grannules. The mixing drum is not essential if a rotary furnace (for example, a fixed axis or Kalko furnace) is used. The furnace may be heated by a gas or oil burner, or heated electrically.

To reduce energy requirements, molten slag may be used directly from the zinc smelter.

A non-leachable vitrified slag resulted whether the final slag was rapidly quenched or allowed to cool slowly. In leaching tests analogous to those described in Example 1 no $V_2O_5$ could be detected down to a limit of detectability of 0.02 mg/l.

I claim:

1. A method of processing spent vanadium pentoxide-containing catalyst from a sulfuric acid manufacturing process into a vitrified form which is environmentally suitable for disposal; which comprises introducing the spent vanadium pentoxide catalyst into a furnace together with oxidic slag-forming materials comprising a mixture of calcium oxide, silica and iron oxide as employed in the smelting of zinc, lead or copper melting together the vanadium pentoxide catalyst and the oxidic slag-forming materials to form a slag removing the slag and solidifying it into a vitreous mass;

the spent vanadium pentoxide catalyst and the slag-forming materials being used in amounts such as to result in a solid amorphous vitrified disposable slag.

2. A method according to claim 1 wherein the spent metal oxide catalyst includes further oxidic materials which are slag-forming materials.

3. A method according to claim 2 wherein the further oxidic materials are selected from silica and potassium oxide.

4. A method according to claim 3 wherein the spent catalyst is silica based and the weight ratio of spent catalyst to slag-forming materials is in the region 1:2 to 1:4.

5. A method according to claim 4 wherein the ratio is 1:2.5 to 1:3.5.

6. A method according to claim 1 conducted as part of a smelting process.

7. A method according to claim 6 wherein the spent catalyst is introduced into the smelting furnace.

8. A method according to claim 6 wherein the spent catalyst is introduced into a roaster upstream of a smelting furnace.

9. A method according to claim 1 wherein a pre-existing slag from a smelting process is employed as the oxidic slag-forming materials.

10. A method according to claim 9 wherein the pre-existing slag is from a non-ferrous smelting process.

11. A method according to claim 10 wherein the non-ferrous slag is from a zinc or lead smelting process.

12. A method according to claim 9 wherein the pre-existing slag is used in the molten state from the smelting process without any intervening cooling step.

13. A method according to claim 1 wherein the proportion of the spent metal oxide catalyst, and the nature and proportions of the slag-forming materials are such that the melting temperature of the slag is not in excess of 1200° C.

14. A method according to claim 1 wherein the furnace is a rotary furnace.

15. A method according to claim 1 wherein the furnace can be tilted into a vertical position for filling with molten material.

16. A method according to claim 1 wherein the spent catalyst is charged into the furnace in the solid state and is subsequently melted in the furnace, prior to the introduction of molten slag-forming materials.

17. A method according to claim 15 wherein the molten slag-forming materials are introduced into the tiltable furnace in its vertical position, then solid spent catalyst is injected into the molten materials, and the melt is heated using a submerged lance.

18. A method according to claim 1 wherein the vitrified amorphous slag has substantially the following composition by weight:

| | |
|---|---|
| SiO₂ | 40–50% |
| CaO | 10–20% |
| FeO | 30–50% | the balance being the residue of the spent catalyst composition and incidental impurities.

19. A method according to claim 1 wherein the metal oxide component of the spent catalyst forms up to 5wt % of the vitrified slag.

* * * * *